US008103983B2

(12) United States Patent
Agarwal et al.

(10) Patent No.: US 8,103,983 B2
(45) Date of Patent: Jan. 24, 2012

(54) ELECTRICALLY-DRIVEN OPTICAL PROXIMITY CORRECTION TO COMPENSATE FOR NON-OPTICAL EFFECTS

(75) Inventors: Kanak B. Agarwal, Austin, TX (US); Shayak Banerjee, Austin, TX (US); Praveen Elakkumanan, Hopewell Junction, NY (US); Lars W. Liebmann, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 12/269,477

(22) Filed: Nov. 12, 2008

(65) Prior Publication Data
US 2010/0122231 A1 May 13, 2010

(51) Int. Cl.
*G06F 17/50* (2006.01)
(52) U.S. Cl. ........................................................ 716/53
(58) Field of Classification Search .................... 716/53
See application file for complete search history.

(56) References Cited

U.S. PATENT DOCUMENTS

| 7,175,940 B2 * | 2/2007 | Laidig et al. .................... 430/5 |
| 7,512,927 B2 * | 3/2009 | Gallatin et al. ................ 716/51 |
| 7,523,429 B2 * | 4/2009 | Kroyan et al. ................ 716/119 |
| 7,900,169 B2 * | 3/2011 | Abdo ......................... 250/252.1 |

* cited by examiner

*Primary Examiner* — Jack Chiang
*Assistant Examiner* — Brandon Bowers
(74) *Attorney, Agent, or Firm* — Libby Z. Toub; Jack V. Musgrove

(57) ABSTRACT

A contour of a mask design for an integrated circuit is modified to compensate for systematic variations arising from non-optical effects such as stress, well proximity, rapid thermal anneal, or spacer thickness. Electrical characteristics of a simulated integrated circuit chip fabricated using the mask design are extracted and compared to design specifications, and one or more edges of the contour are adjusted to reduce the systematic variation until the electrical characteristic is within specification. The particular electrical characteristic preferably depends on which layer is to be fabricated from the mask: on-current for a polysilicon; resistance for contact; resistance and capacitance for metal; current for active; and resistance for vias. For systematic threshold voltage variation, the contour is adjusted to match a gate length which corresponds to an on-current value according to pre-calculated curves for contour current and gate length at a nominal threshold voltage of the chip.

20 Claims, 5 Drawing Sheets

ELECTRICALLY-DRIVEN OPTICAL PROXIMITY CORRECTION TO COMPENSATE FOR NON-OPTICAL EFFECTS

BACKGROUND OF THE INVENTION

1. Field of the Invention

The present invention generally relates to the design and fabrication of integrated circuit chips from silicon wafers, and more particularly to a method of correcting deficiencies in an integrated circuit design which is manufactured using circuit pattern masks and photolithography.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Chip performance and yield are increasingly limited by systematic and random variations introduced during wafer processing. Systematic variations are layout-dependent and can be broadly classified as optical and non-optical in nature. Optical effects have their origin in the photolithographic process steps including mask, resolution enhancement techniques and resist, and are well-modeled in conventional lithography simulators. Optical effects such as pitch-dependent line width variations, flare, corner rounding and line-end shortening all affect electrical properties of devices forming the integrated circuit, and can easily render a chip defective. Optical effects can be mitigated by methods such as optical proximity correction, phase shift masking, and sub-resolution assist feature insertion.

Optical proximity correction (OPC) compensates for optical effects by adjusting the edges of the polygons forming a pattern mask, as illustrated in FIG. 1. The polygons are typically rectangles or other shapes (L-, U-, Z-) that may be decomposed into rectangles whose length and width directions are respectively parallel with the orthogonal x- and y-axes of the coordinate system that lays out the chip. In the example of FIG. 1 different sections of the edges for an integrated circuit pattern mask design 2 are moved inwardly or outwardly depending on the optical effect encountered, to yield a distorted pattern mask design 2'. OPC is carried out by simulating optical lithographic fabrication taking into consideration various optical effects at different stages in the process. The resulting simulated contour is then compared to the target contour and edge placement errors are identified. The objective is to minimize edge placement errors arising from all of the optical steps. While OPC is useful in reducing optical variations, it has its limitations. Minimizing edge placement errors does not necessarily guarantee the best electrical behavior, and non-ideal electrical behavior will adversely affect cell leakage and circuit timing.

Non-optical effects are layout-dependent systematic variations which originate from processes other than lithography. Some examples of non-optical effects are stress variations, well-proximity effect, spacer thickness variations, and rapid thermal anneal (RTA) variations. There is no standard technique to compensate for non-optical effects. One approach to modeling some non-optical effects uses a circuit-level simulation tool such as SPICE, which employs numerical integration formulae to form companion models for circuit elements. While circuit simulators like SPICE are straightforward and fairly quick to run, if the simulation is not set up properly the results can be inaccurate. Also, while SPICE models are able to capture layout-dependent variations such as stress and well proximity, other non-optical effects such as spacer thickness and RTA cannot be captured in the device models due to lack of knowledge of the cell neighborhood, and hence these effects cannot be accounted for at design time.

Designers usually rely on a combination of several ad hoc methods to compensate for non-optical effects, e.g., selective gate length biasing, or RX/PC layer fill. Gate length biasing (originally used for leakage control) simply increases a device's size. It can also be used to compensate for certain global systematic variations. However, gate length biasing may produce inaccurate results since it is performed with coarse discrete increments.

In light of the foregoing, it would be desirable to devise an improved method of compensating for systematic variations in integrated circuit chips which arise from non-optical effects. It would be further advantageous if the method could easily be incorporated into a physical design tool which also takes optical effects of the layout into consideration.

SUMMARY OF THE INVENTION

It is therefore one object of the present invention to provide an improved method of converting of an integrated circuit design into a geometric layout for semiconductor wafer fabrication.

It is another object of the present invention to provide such a method which takes into consideration systematic variations arising from non-optical effects.

It is yet another object of the present invention to provide a method of generating a pattern mask for a layer of an integrated circuit design which compensates for such non-optical variations.

The foregoing objects are achieved in a method of improving performance of an integrated circuit design, by receiving a physical layout of the integrated circuit design, converting the physical layout into a mask design having a shape feature with a contour, simulating a photolithographic construction of a portion of an integrated circuit chip based on the mask design, extracting an electrical characteristic from the simulated integrated circuit chip which is affected by at least one fabrication variation arising from non-optical effects, establishing that the extracted electrical characteristic is not within a design specification, and responsively modifying the contour to reduce the fabrication variation by moving one or more edge sections of the contour until the electrical characteristic is within the design specification. The fabrication variation may arise from non-optical effects such as stress, well proximity, rapid thermal anneal, or spacer thickness.

In the illustrative embodiment, the particular electrical characteristic extracted depends on which layer of the integrated circuit chip is being fabricated from the mask; the electrical characteristic comprises on-current or leakage current when the mask design is for a polysilicon layer of the integrated circuit chip, the electrical characteristic comprises resistance when the mask design is for a contact layer of the integrated circuit chip, the electrical characteristic comprises resistance and capacitance when the mask design is for a metal layer of the integrated circuit chip, the electrical characteristic comprises current when the mask design is for an active layer of the integrated circuit chip, and the electrical characteristic comprises resistance when the mask design is for a via layer of the integrated circuit chip. For the specific example wherein the fabrication variation is systematic threshold voltage variation, the electrical characteristic is a current and the contour is adjusted to match a gate length which corresponds to an on-current value according to a pre-calculated relationship between the contour current and gate length for a nominal threshold voltage of the integrated circuit chip.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
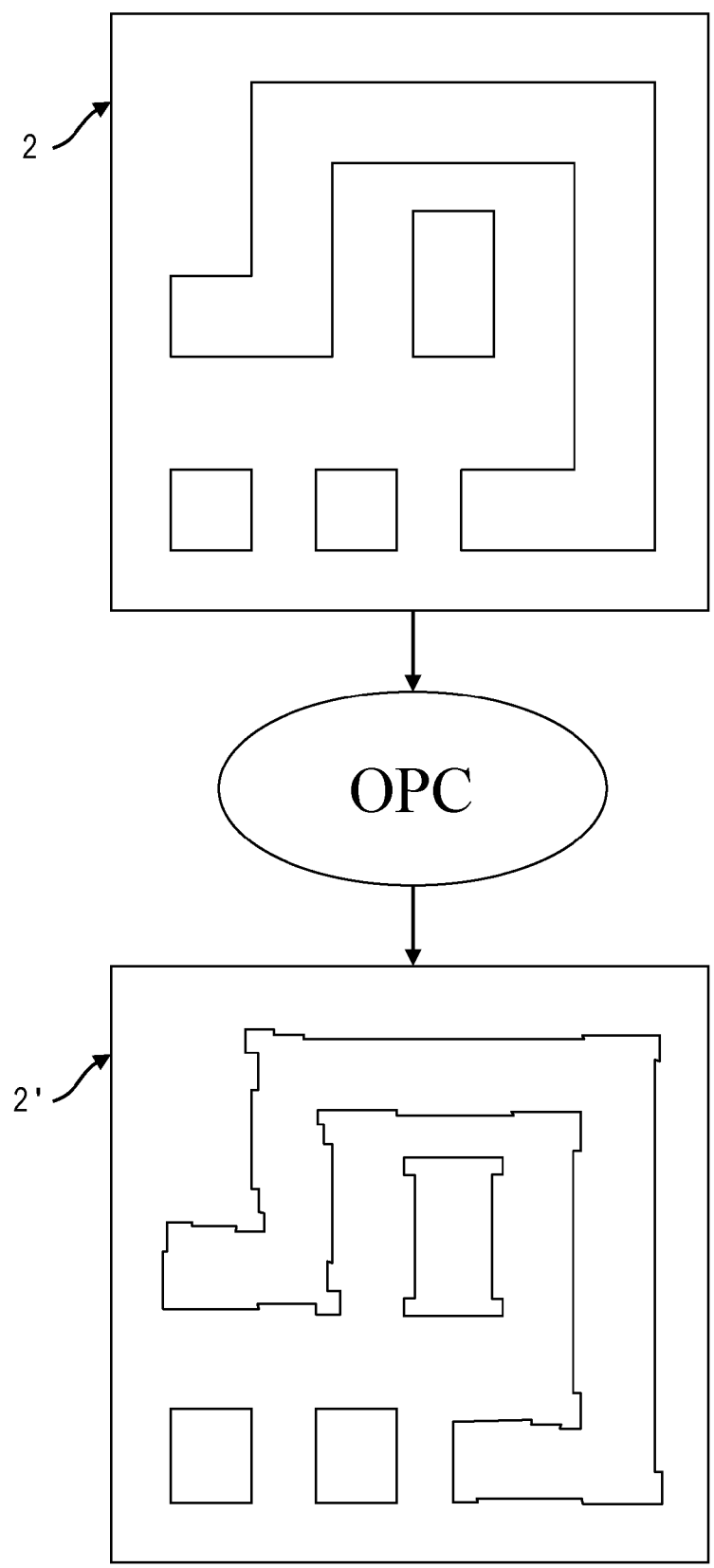
FIG. 1 is a pictorial representation of a conventional optical proximity correction (OPC) procedure which adjusts edge sections of contours on a mask used for integrated circuit fabrication.
Figure 2:
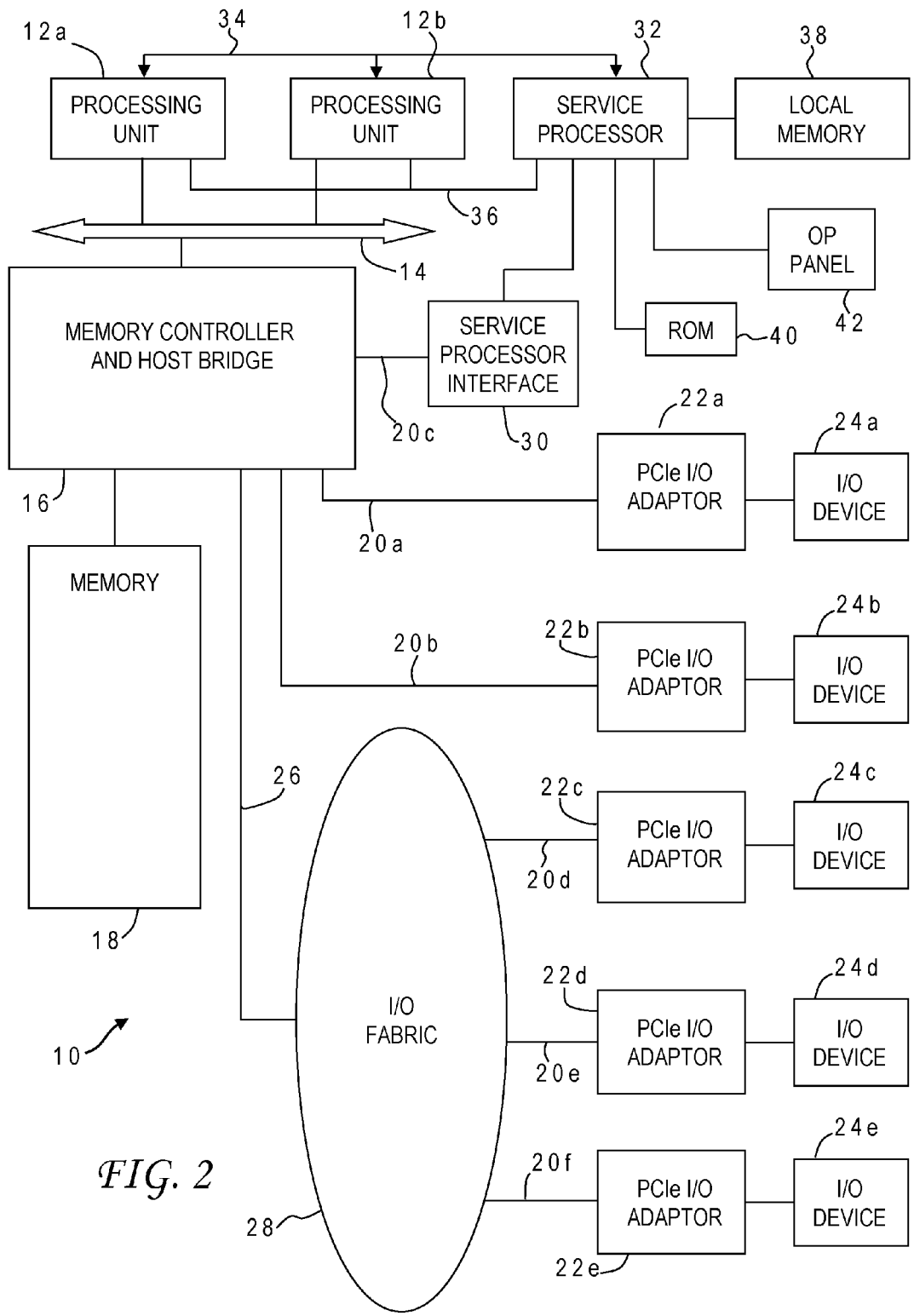
FIG. 2 is a block diagram of a computer system programmed to carry out electrically-driven optical proximity correction for non-optical effects in accordance with one implementation of the present invention.

With reference now to the figures, and in particular with reference to FIG. 2, there is depicted one embodiment 10 of a computer system in which the present invention may be implemented to carry out the design of an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

While the illustrative implementation provides program instructions embodying the present invention on disk drive 36, those skilled in the art will appreciate that the invention can be embodied in a program product utilizing other computer-readable storage media excluding transitory media such as propagating signals. The program instructions may be written in the C++ programming language for an AIX environment. Computer system 10 carries out program instructions for an integrated circuit physical design process that uses novel correction techniques to manage systematic variations arising from non-optical effects. Accordingly, a program embodying the invention may include conventional aspects of various physical design tools, and these details will become apparent to those skilled in the art upon reference to this disclosure.

Figure 3:
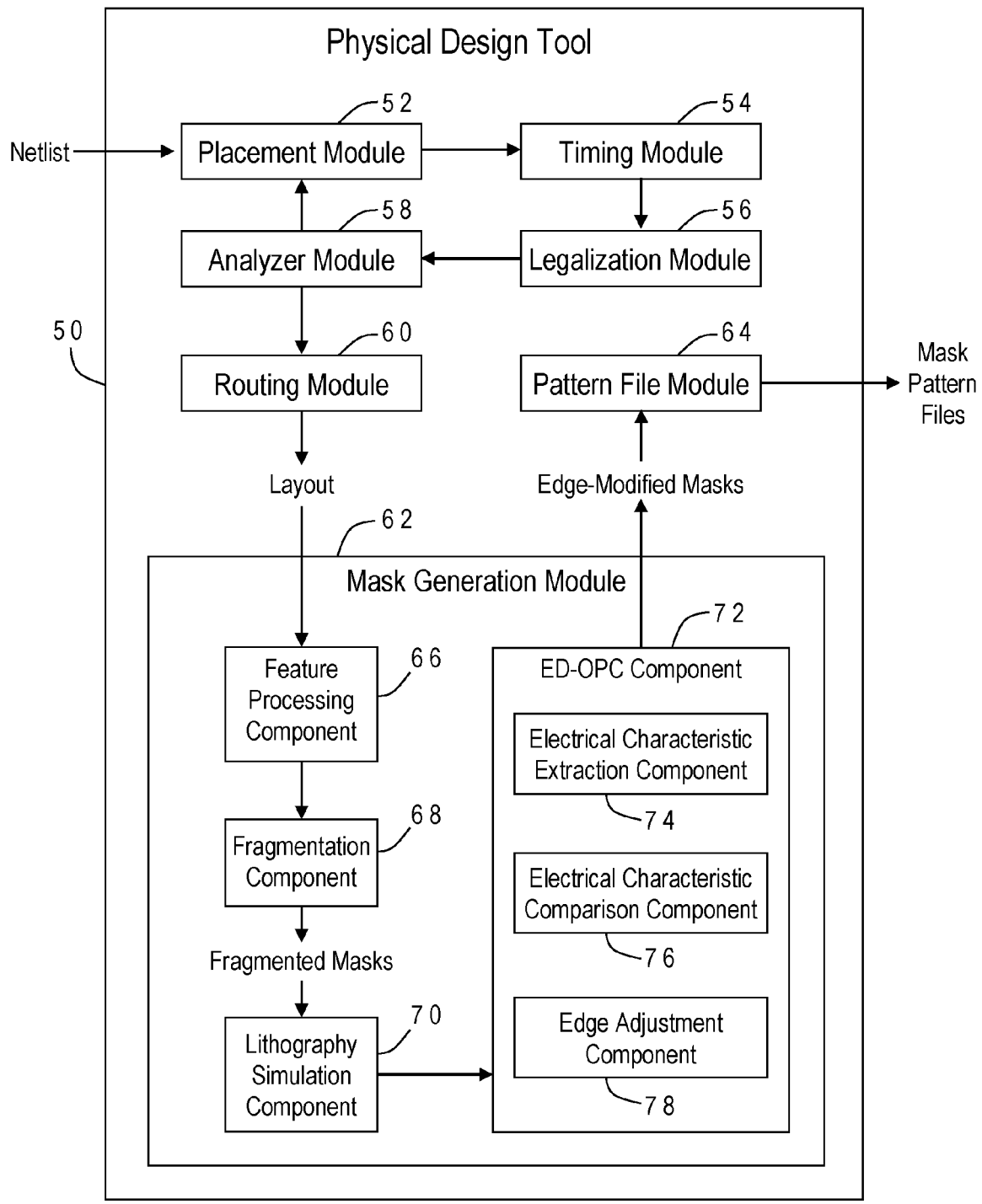
FIG. 3 is a block diagram of one embodiment of a physical design tool program which is carried out by the computer system of FIG. 2 in accordance with the present invention, showing various software modules used to convert a logical description of an integrated circuit design into pattern files for generating photolithography masks.

Referring now to FIG. 3, there is depicted one embodiment of a physical design tool 50 (software application) which is executed by computer system 10 in accordance with the present invention. Tool 50 includes a plurality of program modules including a placement module 52, a timing module 54, a legalization module 56, an analyzer module 58, a routing module 60, a mask generation module 62, and a pattern file module 64. Placement module 52 receives a logical circuit description for an integrated circuit design in the form of a netlist, and locates cells or objects in the netlist to optimize some placement parameter, for example, quadratic optimization based on total wirelength. Once an initial placement is obtained, timing module 54 performs various transforms such as repeater insertion (buffers or inverters), gate sizing (repowering), logic re-structuring or cloning, etc., to improve the timing characteristics of the design. Any overlaps in the cells of the modified placement of the circuit design are then resolved by legalization module 56. After timing optimization and any legalization, the physical design is analyzed by analyzer module 58 which simulates operation of the circuit and provides circuit performance values. If these values are not within specification, analyzer module 58 invokes various constraints or design parameters to further refine placement and optimization, and the design is iteratively returned to placement module 52. Once the performance of the placed design is deemed acceptable, it proceeds to routing module 60 which determines the specific interconnections between cells along designated wiring tracks. Modules 52-60 are generally of conventional design and details of these components will accordingly become apparent to those skilled in the art.

The output of routing module 60 is a physical layout for the integrated circuit design which is representative of a plurality of layered geometric shapes each defined by contours having edges that may be broken down into edge segments. The physical layout may include for example a polysilicon layer, contact layer, metal layer, active layer (diffusion layer) and a via/CA layer, each having their own shape features. The physical layout from routing module 60 is received by a feature processing component 66 of mask generation module 60. Feature processing component 66 performs pre-processing of the features in the layout, in particular, generating assist features such as sub-resolution scattering (intensity-leveling) bars which are formed on the mask in such a way that they are not themselves reproduced in the physical semiconductor layer, and sizing shape features up for etch bias. Feature processing component 66 may use conventional methods including reticle enhancement techniques such as shape generation around the actual drawn shapes to improve the depth of focus of light, and addition of pre-calibrated biases on the drawn shapes for printing, etch and other process steps. This processing is applied to each layer to convert the physical layout into a plurality of mask designs.

A fragmentation component 68 takes the pre-processed features from feature processing component 66 and fragments the layered shapes into small strips. While conventional OPC requires fairly fine fragmentation (e.g., 10 nm to 15 nm) to achieve acceptable accuracy, EDOPC is able to achieve superior conformance to electrical specifications using coarser fragments (on the order of 50 nm) which increases computational efficiency. This fragmentation of the edges enhances lithographic simulation and makes it easier to compare features between the output of the simulation and the initial physical layout. The particular type of fragmentation performed may vary depending on the layer that is being processed and the specific technology that is embodied in the layout. The output of fragmentation component 68 is a set of initial mask designs.

A lithography simulation component 70 simulates the construction of a portion of the integrated circuit on a semiconductor wafer based on the fragmented layout, i.e., it determines how the layered shapes and their features as set forth in the initial mask designs will actually appear on the physical substrate. The lithography simulation allows integrated circuit designers to discern whether their photoresist equipment can accurately print the integrated circuit layouts. The lithography simulation draws on a database that characterizes equipment, materials and processes in a known manner to derive and simulate photolithographic reproduction of the mask designs on a wafer.

The results of the lithography simulation are then processed by electrically-driven optical proximity correction (EDOPC) component 72 to correct or mitigate deviations between electrical properties of the theoretical shapes and their simulated reproduction. EDOPC component 72 guarantees the electric characteristics of the shapes in the initial mask designs by moving only certain edges to minimize the difference in actual and target electrical characteristic behavior.

EDOPC component 72 includes an electrical characteristic extraction component 74, an electrical characteristic comparison component 76, and an edge adjustment component 78. Electrical characteristic extraction component 74 extracts an electrical characteristic of the simulated integrated circuit chip, particularly one which is affected by a fabrication variation which arises from a non-optical effect. The various types of non-optical effects which are compensated for by the present invention include stress, well-proximity effect, spacer thickness variations from reactive ion etching or other sources, and rapid thermal anneal (RTA) variations, all of which are discussed in further detail below in conjunction with FIG. 5. These non-optical effects cause electrical variations that are edge-movement dependent, that is, they can be corrected or mitigated by movement of edge sections of the shape contours.

In the illustrative implementation, the electrical characteristic extracted from each layer depends on the layer type, e.g., the extracted electrical characteristic comprises on/off currents for a polysilicon layer, resistance for a contact layer, resistance and capacitance for a metal layer, current for an active layer, and resistance for a via/CA layer. Those skilled in the art will recognize that other electrical characteristics can be extracted in place of, in addition to, or with other combinations of the noted characteristics, such as power or performance (timing). The electrical characteristics may be extracted by electrical characteristic extraction component 74 using algorithms which represent physical mechanisms that produce the electrical behavior of a particular layer for a given simulated contour of the shapes. For example, currents in a polysilicon contour may be extracted using a slicing technique in which any transistor is represented as a set of parallel transistors (slices) wherein the sum of the widths of the set of slices equals the width of the transistor. Slices are assumed to be small enough to have constant gate length even though the transistor gate length is not constant. As a result, this length can be mapped to the slice current using a curve generated by a simulation program such as SPICE. Slice currents are then summed to provide the total transistor current, which is then used to determine an effective gate length for the transistor. Different curves are used for on and off currents, which are assigned different effective gate lengths.

Electrical characteristic comparison component 76 determines whether the extracted electrical characteristic (e.g., a polysilicon current) is in conformance with a target electrical characteristic, i.e., whether the electrical characteristic is within specification according to the integrated circuit design. The specifications are input by the circuit designer to electrical characteristic comparison component 76. If the electrical characteristic calculation is within specification, the mask design is not modified. However, if the electrical characteristic is not within specification then the contour is modified to reduce the fabrication variation and preserve electrical fidelity.

Edge adjustment component 78 adjusts edges of the layered shapes in the mask designs in response to the determination by electrical characteristic comparison component 76 that the extracted electrical characteristic for a layer fails to conform with the target electrical characteristic. Edge adjustment is performed as a function of the difference between the extracted electrical characteristic and the target electrical characteristic, while using the electrical characteristic of the shape as an optimization constraint, to compensate for the non-optical fabrication variation and thereby mitigate its effect until electrical fidelity is preserved (i.e., the electrical characteristic is within design specification). The systematic variations to be considered by edge adjustment component 78 are input by the circuit designer based on known models for these behaviors. This optimization relocates edge segments in such a way that the subject electrical characteristic moves towards the target characteristic according to the basic equations governing the geometric and electrical relationships of the shapes (or layer) and non-optical effect under consideration. For example, if the polysilicon current ($I_{on}$ or $I_{off}$) calculated by electrical characteristic extraction component 74 does not meet the target characteristic, then edge segments are moved until the calculated current is in conformance with the specification. In addition to preserving electrical fidelity, the edge adjustment may further adjust the edges to ensure a certain degree of pattern fidelity by taking into account edge placement error (EPE) and mask enhancement error factor (MEEF), both well-known OPC determinations that in this case are obtained from the difference between the initial mask design and the simulation output.

Because the EDOPC performed at the edge movement block is essentially minimizing the difference in the on-currents between the target and resist contour, this step can be formulated as an optimization problem. For example, given a polysilicon mask design with multiple transistors, the optimization problem for gate regions (areas of polysilicon overlapping the active layer) reduces to minimizing the sum of the differences between the calculated current and the target current for all transistors, while maintaining each leakage current below the nominal leakage current for the design. For non-gate regions, additional constraints are applied to ensure minimum overlap over contacts, minimum polysilicon-to-polysilicon spacing, minimum polysilicon-to-contact spacing, and minimum polysilicon width. The objective function of this EDOPC optimization formulation aims at accuracy of timing by minimizing the difference in the on-currents between the target and resist contour. Leakage is used here as a constraint to ensure leakage-limited yield is not affected as a result of higher timing accuracy. For the non-critical polysilicon areas, yield check constraints are preferably enforced to avoid catastrophic yield issues such as open and short circuits. Once this objective function has been minimized, the modified mask layout for the polysilicon layer is considered ready to be used for manufacturing, and is sent from mask generation module 62 to pattern file module 64. Pattern file module 64 writes the mask pattern files to a permanent storage device such as a hard disk drive of computer system 10. The mask pattern files may thereafter be transmitted to a mask house for preparation of the physical masks used in the photolithography fabrication.

Figure 4:
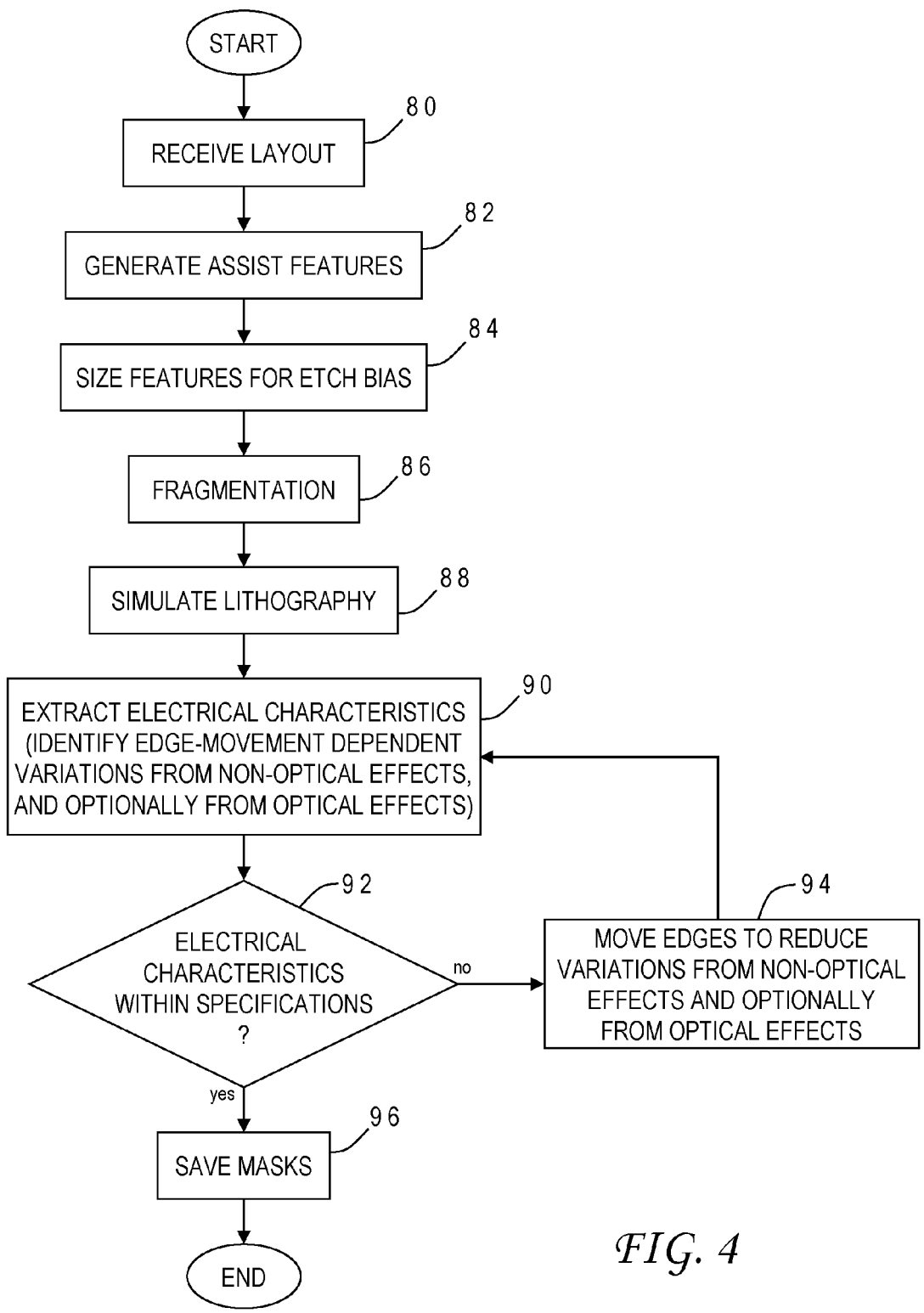
FIG. 4 is a chart illustrating the logical flow for electrically-driven optical proximity correction for non-optical effects in accordance with one implementation of the present invention.

The present invention may be further understood with reference to the flow chart of FIG. 4 which illustrates one implementation for the mask generation process. The process begins with the physical layout provided by the other physical design tool modules (80). Assist features are generated (82), and features are sized up for etch bias (84). The layout is fragmented to ensure that structures printed on the wafer closely resemble target shapes embodied in the initial mask layout (86). After fragmentation, a lithography simulation is run to see how the layered shapes and their features as set forth in the initial mask layout will look on an actual wafer (88). Electrical characteristics are extracted for each layer from the simulated layout (90), identifying variations from non-optical effects which can be affected by edge-movement. A determination is made as to whether the electrical characteristics are within specifications (92). If not, edges or edge sections are adjusted to reduce the variations from non-optical effects (94), and the extraction step is iteratively repeated at 90. After the edge movements result in electrical characteristics which are within specifications, the modified mask patterns are save (96).

Figure 5:
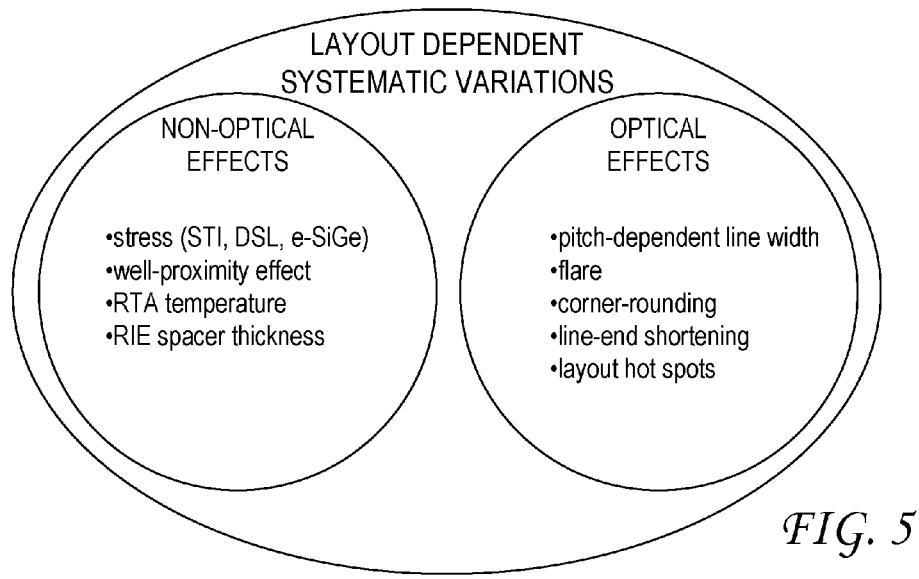
FIG. 5 is a Venn diagram of layout dependent systematic variations which arise from either optical or non-optical effects, both of which may be addressed in the present invention.

The present invention allows the designer to compensate for non-optical effects because EDOPC is based on matching of the electrical characteristics instead of matching shapes. Non-optical (non-litho) effects are incorporated by including corresponding models in the correction process. Several non-optical effects that result in systematic variations are shown in FIG. 5, and include without limitation various types of stress such as dual stress liner (DSL), e-SiGe, and shallow trench isolation (STI), well proximity effect, spacer thickness variations, and RTA variations. Stress (mobility) depends on layout parameters such as N-well or DSL edges, active area overhang, polysilicon pitch, environment density, the number and location of contacts, etc. EDOPC can provide different edge correction for different devices depending on the values of these layout parameters, to achieve perfect tracking in presence of systematic stress variation. Different edge correction may also be provided for well proximity effect, depending on the distance between a field-effect transistor and the well mask edge. Different regions in the chip may use different edge correction for RTA variation depending on the RTA flux map. Spacer thickness variations are caused by the topography of the chip. Required spacer deposition rate in a particular chip region varies as a function of the normalized surface area of structures in the neighborhood. However, since across-chip spacer deposition rate is uniform, non-uniform spacer thicknesses are observed which in turn leads to variation in electrical properties of transistors.

The foregoing discussion describes how the invention may be used to correct or mitigate systematic variations arising from non-optical effects. However, in the preferred implementation the present invention provides electrically-driven optical proximity correction for both non-optical and optical effects simultaneously. The optical effects may include pitch-dependent line width variation, flare, corner rounding, line-end shortening, and layout hot spots, as shown in FIG. 5. Those skilled in the art will appreciate that the flow for EPOPC of non-optical effects as described above may be consolidated with the flow for EDOPC of optical effects as disclosed in copending U.S. patent application Ser. No. 12/024,188 filed Feb. 1, 2008, which is hereby incorporated. In other words, electrical characteristic extraction component 74 extracts electrical characteristics of the simulated integrated circuit chip which are affected by fabrication variations arising from a non-optical effect and from an optical effect, while edge adjustment component 78 adjusts edges of the layered shapes in the mask design to mitigate the non-optical fabrication variation and to mitigate the optical fabrication variation, i.e., minimizing overall electrical error from both types of effects. The combined EDOPC results in desired electrical characteristics for the integrated circuit in the presence of all recognized systematic variations.

Figure 6:
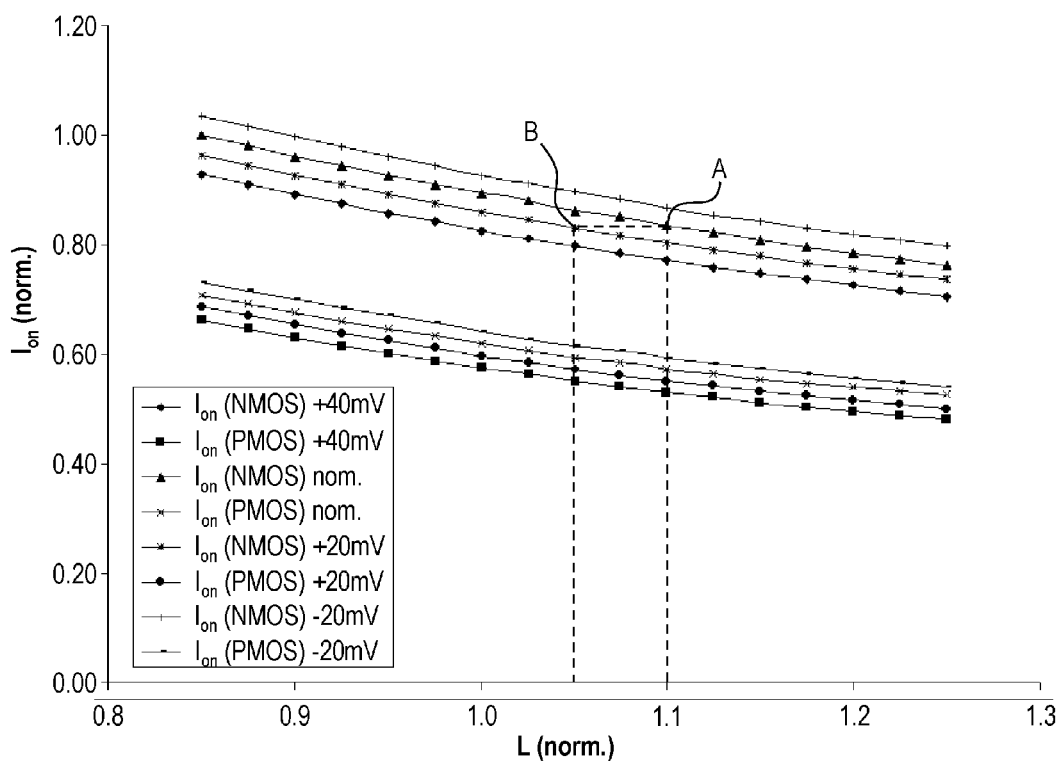
FIG. 6 is a graph depicting multiples curves of "ON" current ($I_{on}$) versus gate length (L) for different voltages which may be used in accordance with the present invention to correct systematic variations in threshold voltage.

Well proximity effect and RTA variations can further be modeled as a change in the threshold voltage ($V_T$) of transistors. Well proximity effect is the lateral scattering of ions from the edge of the photoresist during the well implant step. This effect manifests itself as a change in a shift of threshold voltage of transistors which are close to the well edge. Rapid thermal anneal is the process of heating the wafer to high temperatures to activate implants. To prevent diffusion, the time period for annealing is kept short; however, if the anneal time is too short the wafer does not attain thermal equilibrium, leading to pattern-density dependent $V_T$ variations across the wafer. Systematic $V_T$ variations can lead to timing errors in the integrated circuit. To mitigate these effects, the EDOPC technique of the present invention employs a set of transistor curves characterized at different threshold voltages. FIG. 6 illustrates one set of curves that may be used for this purpose. The curves show the normalized relationship between on-current ($I_{on}$) and gate length (L) for different device types (NMOS/PMOS) at four different voltages each (nominal, +20 mV, +40 mV, and −20 mV) as characterized using SPICE. Given the shift in $V_T$ at a particular chip region due to RTA or well proximity effect, the EDOPC algorithm can be tuned to match the contour current at a given $V_T$ to the nominal value for this portion of the integrated circuit design. For example, consider a design in which an NMOS device should have a normalized gate length of 1.1 for the nominal threshold voltage of the design, but the NMOS device is located in a region of the chip/layout that has been determined to have a +20 mV deviation in threshold voltage. Point A in FIG. 6 accordingly represents the ideal $I_{on}$ current for the NMOS device at the designed gate length, but this current corresponds to point B for the +20 mV curve which yields a normalized gate length of around 1.05, so an edge of the device gate is adjusted by 0.05. This approach reduces timing errors and, consequently, circuit-limited yield, yet requires no additional computation cost, only the pre-computed curves needed for a given $V_T$ shift.

EDOPC in accordance with the present invention may be implemented using the Calibre Workbench suite of tools sold by Mentor Graphics of Wilsonville, Oreg., with immersion lithography optical and resist models. All electrical fragment processing can be performed by converting contour and EDOPC layers to text-form, which is then handled using Perl scripts. Experiments were performed on logic cells in 45 nm technology using a constant size fragmentation scheme over gate regions. Results show that EDOPC provides up to 8% improvement in timing accuracy in the presence of systematic $V_T$ variations, over conventional OPC. Improvement is more pronounced at higher $V_T$ shifts (e.g., 40 mV).

The present invention thus guarantees the electrical characteristics of the shapes in the initial mask design in addition to ensuring pattern fidelity between the initial mask design and lithography simulation output. Instead of pushing manufacturing information upstream as done in conventional OPC techniques, the EDOPC in this disclosure pushes design information downstream, such as criticality of cell blocks, enabling the closing of an otherwise open design for a manufacturing loop. In particular, EDOPC allows more fine-grained tuning of electrical parameters as opposed to existing methods such as gate length biasing. In addition, this EDOPC methodology has the added improvement of lowering mask complexity over the conventional OPC approach since not all features on a mask are electrically critical. Therefore, the EDOPC allows concentration of OPC computational efforts on electrically critical regions.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method of improving performance of an integrated circuit design, comprising:
   receiving a physical layout of the integrated circuit design by executing first instructions in a computer system;

converting the physical layout into at least one mask design having a shape feature with a contour by executing second instructions in the computer system;
simulating a photolithographic construction of a portion of an integrated circuit chip based on the mask design by executing third instructions in the computer system;
extracting an electrical characteristic from the simulated integrated circuit chip which is affected by at least one fabrication variation arising from non-optical effects by executing fourth instructions in the computer system;
establishing that the extracted electrical characteristic is not within a design specification by executing fifth instructions in the computer system;
responsive to said establishing, modifying the contour to compensate for the fabrication variation by executing sixth instructions in the computer system; and
storing the mask design with the modified contour in a storage device of the computer system.

2. The method of claim 1 wherein said modifying moves one or more edge sections of the contour.

3. The method of claim 1 wherein said establishing and modifying are iteratively repeated until the electrical characteristic is within the design specification.

4. The method of claim 1 wherein the fabrication variation arises from a non-optical effect selected from the group consisting of stress, well proximity, rapid thermal anneal, and spacer thickness.

5. The method of claim 1 wherein:
the electrical characteristic comprises on-current when the mask design is for a polysilicon layer of the integrated circuit chip;
the electrical characteristic comprises resistance when the mask design is for a contact layer of the integrated circuit chip;
the electrical characteristic comprises resistance and capacitance when the mask design is for a metal layer of the integrated circuit chip;
the electrical characteristic comprises current when the mask design is for an active layer of the integrated circuit chip; and
the electrical characteristic comprises resistance when the mask design is for a via layer of the integrated circuit chip.

6. The method of claim 1 wherein:
the fabrication variation is systematic threshold voltage variation;
the electrical characteristic is a current of the contour; and
said modifying adjusts the contour to match a gate length which corresponds to an on-current according to a pre-calculated relationship between the contour current and gate length for a nominal threshold voltage of the integrated circuit chip.

7. A computer system comprising:
one or more processors which process program instructions;
a memory device connected to said one or more processors; and
program instructions residing in said memory device for improving performance of an integrated circuit design by receiving a physical layout of the integrated circuit design, converting the physical layout into at least one mask design having a shape feature with a contour, simulating a photolithographic construction of a portion of an integrated circuit chip based on the mask design, extracting an electrical characteristic from the simulated integrated circuit chip which is affected by at least one fabrication variation arising from non-optical effects, establishing that the extracted electrical characteristic is not within a design specification, responsively modifying the contour to compensate for the fabrication variation, and storing the mask design with the modified contour.

8. The computer system of claim 7 wherein the modifying moves one or more edge sections of the contour.

9. The computer system of claim 7 wherein said establishing and modifying are iteratively repeated until the electrical characteristic is within the design specification.

10. The computer system of claim 7 wherein the fabrication variation arises from a non-optical effect selected from the group consisting of stress, well proximity, rapid thermal anneal, and spacer thickness.

11. The computer system of claim 7 wherein:
the electrical characteristic comprises on-current when the mask design is for a polysilicon layer of the integrated circuit chip;
the electrical characteristic comprises resistance when the mask design is for a contact layer of the integrated circuit chip;
the electrical characteristic comprises resistance and capacitance when the mask design is for a metal layer of the integrated circuit chip;
the electrical characteristic comprises current when the mask design is for an active layer of the integrated circuit chip; and
the electrical characteristic comprises resistance when the mask design is for a via layer of the integrated circuit chip.

12. The computer system of claim 7 wherein:
the fabrication variation is systematic threshold voltage variation;
the electrical characteristic is a current of the contour; and
the modifying adjusts the contour to match a gate length which corresponds to an on-current value according to a pre-calculated relationship between the contour current and gate length for a nominal threshold voltage of the integrated circuit chip.

13. A computer program product comprising:
a computer-readable storage medium; and
program instructions residing in said storage medium for improving performance of an integrated circuit design by receiving a physical layout of the integrated circuit design, converting the physical layout into at least one mask design having a shape feature with a contour, simulating a photolithographic construction of a portion of an integrated circuit chip based on the mask design, extracting an electrical characteristic from the simulated integrated circuit chip which is affected by at least one fabrication variation arising from non-optical effects, establishing that the extracted electrical characteristic is not within a design specification, responsively modifying the contour to compensate for the fabrication variation, and storing the mask design with the modified contour.

14. The computer system of claim 13 wherein the modifying moves one or more edge sections of the contour.

15. The computer system of claim 13 wherein said establishing and modifying are iteratively repeated until the electrical characteristic is within the design specification.

16. The computer system of claim 13 wherein the fabrication variation arises from a non-optical effect selected from the group consisting of stress, well proximity, rapid thermal anneal, and spacer thickness.

17. The computer system of claim 13 wherein:
the electrical characteristic comprises on-current when the mask design is for a polysilicon layer of the integrated circuit chip;
the electrical characteristic comprises resistance when the mask design is for a contact layer of the integrated circuit chip;
the electrical characteristic comprises resistance and capacitance when the mask design is for a metal layer of the integrated circuit chip;
the electrical characteristic comprises current when the mask design is for an active layer of the integrated circuit chip; and
the electrical characteristic comprises resistance when the mask design is for a via layer of the integrated circuit chip.

18. The computer system of claim 13 wherein:
the fabrication variation is systematic threshold voltage variation;
the electrical characteristic is a current of the contour; and
said modifying adjusts the contour to match a gate length which corresponds to an on-current value according to a pre-calculated relationship between the contour current and gate length for a nominal threshold voltage of the integrated circuit chip.

19. A computer-implemented method for electrically-driven optical proximity correction of a systematic variation in an integrated circuit design arising from a non-optical effect, the method comprising:
receiving a physical layout of the integrated circuit design which includes a plurality of layered shapes by executing first instructions in a computer system;
converting at least one layer of the physical layout into a mask design having a shape feature with a contour by executing second instructions in the computer system;
generating assist features for use in photolithographic reproduction of the mask design by executing third instructions in the computer system;
sizing the shape feature in the mask design for etch bias by executing fourth instructions in the computer system;
fragmenting the mask design into a plurality of strips which define edge segments of the contour by executing fifth instructions in the computer system;
simulating a photolithographic construction of a portion of an integrated circuit chip based on the mask design by executing sixth instructions in the computer system;
extracting an electrical characteristic from the simulated integrated circuit chip which is affected by the systematic variation arising from the non-optical effect, wherein the electrical characteristic comprises on-current when the mask design is for a polysilicon layer of the integrated circuit chip, the electrical characteristic comprises resistance when the mask design is for a contact layer of the integrated circuit chip, the electrical characteristic comprises resistance and capacitance when the mask design is for a metal layer of the integrated circuit chip, the electrical characteristic comprises current when the mask design is for an active layer of the integrated circuit chip, and the electrical characteristic comprises resistance when the mask design is for a via layer of the integrated circuit chip by executing seventh instructions in the computer system;
establishing that the extracted electrical characteristic is not within a design specification by executing eighth instructions in the computer system;
responsive to said establishing, moving one or more of the edge segments of the contour to compensate for the systematic variation until the electrical characteristic is within the design specification by executing ninth instructions in the computer system; and
storing the mask design with the moved edge segments of the contour in a storage device of the computer system.

20. The method of claim 19 wherein:
the systematic variation is a first systematic variation;
the electrical characteristic is further affected by a second systematic variation arising from an optical effect; and
the edge segments are further moved to compensate for the second systematic variation.

* * * * *